United States Patent

[11] 3,611,290

[72] Inventors James A. Luisi
Anaheim;
Sergei M. Fomenko, Woodland Hills, both of Calif.

[21] Appl. No. 734,002
[22] Filed June 3, 1968
[45] Patented Oct. 5, 1971
[73] Assignee North American Rockwell Corporation
El Sequndo, Calif.

[54] FINGERPRINT MINUTIAE READING DEVICE
3 Claims, 3 Drawing Figs.

[52] U.S. Cl. 340/146.3 E
[51] Int. Cl. G06k 9/12
[50] Field of Search 340/146.3

[56] References Cited

UNITED STATES PATENTS

| | | | |
|---|---|---|---|
| 2,838,602 | 6/1958 | Sprick | 340/146.3 X |
| 3,050,711 | 8/1962 | Harmon | 340/146.3 |
| 3,234,513 | 2/1966 | Brust | 340/146.3 |
| 3,293,604 | 12/1966 | Klein et al. | 340/146.3 |
| 3,295,105 | 12/1966 | Gray et al. | 340/146.3 |
| 3,370,271 | 2/1968 | Van Dalen et al. | 340/146.3 |
| 3,496,541 | 2/1970 | Haxby et al. | 340/146.3 |
| 3,112,468 | 11/1963 | Kamentsky | 340/146.3 |

*Primary Examiner*—Maynard R. Wilbur
*Assistant Examiner*—Leo H. Boudreau
*Attorneys*—L. Lee Humphries, H. Fredrick Hamann and Robert G. Rogers

ABSTRACT: A fingerprint is observed, a small portion at a time, using a flying spot scanner, whose spot travels along a predetermined path at each position to provide an electrical analog signal indicative of the nature of the fingerprint at each position. The analog signal is converted into digital form and temporarily stored in a memory having a plurality of storage elements. The signal stored in the memory is constantly circulated through each of the storage elements to provide for detection of minutiae (i.e. ridge endings, bifurcations, etc.) regardless of their angular orientation. Detecting the occurrence of specified minutiae is achieved by sensing the states of selected ones of the storage elements.

INVENTORS
JAMES A. LUISI
SERGEI M. FOMENKO
BY Philip M. Hinderstein
ATTORNEY

INVENTORS
JAMES A. LUISI
SERGEI M. FOMENKO
BY Philip M. Hinderstein
ATTORNEY

INVENTORS
JAMES A. LUISI
SERGEI M. FOMENKO
BY Philip M. Hinderstein
ATTORNEY

FINGERPRINT MINUTIAE READING DEVICE

BACKGROUND OF THE INVENTION

1. Field of the Invention

The present invention relates to the detection of specified patterns within a given area and, more particularly, to a system for automatically providing an indication of the position and orientation of specified minutiae in a fingerprint.

2. Description of the Prior Art

With crime in the United States and elsewhere on the upswing and with the relative supply of trained law enforcement personnel on the decline, the law enforcement community has been forced, in recent years, to investigate and consider the automatic processing of the large amounts of data it is required to maintain. One area of recent interest has been in the automatic processing of fingerprints. A few facts will serve to indicate why this is the case. The Federal Bureau of Investigation has a fingerprint file which consists of over 182,000,000 fingerprint cards, each having 10 prints thereon. There are some 13,000 agencies throughout the world contributing fingerprint cards to the FBI and the FBI receives over 27,500 inquiries per day. In its Washington offices alone, the FBI has over 1000 people whose task it is to search and classify fingerprint cards. The California Bureau of Criminal Identification and Investigation has a file consisting of approximately 5,500,000 fingerprint cards and receives in excess of 95,000 inquiries per month. The New York State Identification and Intelligence System has a file in excess of 1,300,000 fingerprint cards and receives more than 200,000 inquiries per year. These figures alone serve to indicate the enormity of the task of reading and classifying fingerprints for the purposes of identification and matching.

Other areas would benefit from a device for automatically reading fingerprints. For example, the economy of the United States today is based on the credit system and the use of credit cards. However, millions of dollars are lost annually because of the use of lost or stolen credit cards. With an automatic fingerprint reader and correlator, much of this could be eliminated. Each credit card could be made so that upon insertion into a machine, a central storage file would automatically locate the file of the credit card owner which would include his or her fingerprint records. Then, by merely placing the credit card holder's finger on a glass or the like, an automatic reader could read the fingerprint and provide the information to a correlation system which would determine whether the fingerprint of the credit card holder matches those in the file of the credit card owner. With automatic reading and correlating apparatus, this could be done in a matter of seconds.

Because of the importance of this problem, many suggestions have been made in recent years for automatic fingerprint readers and recorders. Many of the proposed systems operate to locate fingerprint minutiae, such as ridge endings or bifurcations, since the use of fingerprint minutiae as a means of positive, legal identification has been proven in practice. Therefore, since the automatic detection of specified minutiae is basically a problem in pattern recognition, it would appear to be a simple matter to provide an automatic system for the detection of such minutiae. However, the recognition of these minutiae is complicated by several factors, such as: (1) the specified minutiae occur at arbitrary orientations; (2) there are variations in ridge breadth and distance between ridge centers; (3) there are various inherent defects in all fingerprints, such as scars, warts, etc.; (4) false ridge endings appear at the boundaries of fingerprints and scars; and (5) the quality of fingerprints varies widely with respect to contrast and clarity. As a result, in almost all cases, the proposed system has either been too complex, too inefficient or inoperative.

For example, it has been proposed to use a large scale computer to control the scan of a fingerprint along some predetermined pattern and to store the resulting complex electrical signal. Subsequently, in order to identify a fingerprint, it will have to be scanned and the resultant complex electrical signal compared with those in the memory banks of the computer. Although this approach may well be operative, it has the inherent disadvantage of all mass data-processing systems, and that is the requirement for enormous amounts of complex and costly equipment.

Another suggested approach has been to use holographic techniques whereby two fingerprints may be matched or the location of specified minutiae on fingerprints identified by simultaneously illuminating an unknown fingerprint and a known mask with coherent laser light and determining the locations of a match. However, apparently because of the complexity and the minute detail present in typical fingerprints, it has not been possible to make such a system which operates reliably.

Several other approaches have been suggested whereby a fingerprint is scanned along a predetermined pattern to find the location of specified minutiae therein, which locations may be read out and/or stored for classification and correlation. However, all previous systems have had to reach a compromise between the requirements of accuracy and the penalties of complexity. In other words, in order to provide a system which operated to generate an accurate indication of the location of the specified minutiae, it has, heretofore, been necessary to provide extremely complex equipment. On the other hand, in order to provide relatively simple and trustworthy equipment, it has been necessary to accept a high degree of false indications.

SUMMARY OF THE INVENTION

According to the present invention, there is provided a system for automatically providing an indication of the position and angular orientation of specified minutiae in a fingerprint. The proposed system is fundamentally very simple and can be implemented with existing off-the-shelf, commercial, electronic components. The present system can be used to detect any type of minutiae such as ridge endings and/or bifurcations, as required. The system will detect as many specified minutiae as possible with a minimum number of false alarms.

Briefly, the present fingerprint minutiae reading device operates by sequentially observing small portions of a fingerprint, with the use of a flying spot scanner, to derive, at each position, an electrical analog signal indicative of the pattern at the position. The analog signal, so derived, is converted into digital form and temporarily stored in a small memory having a plurality of storage elements. The signal in the memory is constantly circulated through each of the storage elements to aid in the recognition of minutiae regardless of their angular orientation. Finally, the occurrence of specified minutiae is detected by sensing the states of selected ones of the storage elements. An automatic contrast control circuit adjusts the detection process as a function of the local quality of the fingerprint image to increase the probability of detection of minutiae in prints of relatively poor quality. The system includes apparatus to inhibit the recognition of false ridge endings in broken ridges, the terminations of ridges at the print boundaries, or the terminations of ridges produced by scars, and, if it becomes desirable to recognize the existence of scars, etc., the ridge endings produced by scars may be detected and recorded for later processing.

It is therefore an object of the present invention to provide a system for detecting specified patterns.

It is a further object of the present invention to provide a novel fingerprint minutiae reading device.

It is still another object of the present invention to provide a system for detecting the position and orientation of specified minutiae in a fingerprint.

It is another object of the present invention to provide a fingerprint minutiae reading device in which a digitized image of the fingerprint is stored in a temporary memory and in which the image in the memory is circulated to assist in the detection of minutiae having arbitrary angular orientations.

It is still another object of the present invention to provide a fingerprint minutiae reading device which includes an automatic contrast control circuit to permit adaptation to the local quality of a fingerprint image.

Still another object of the present invention is the provision of a fingerprint minutiae reading device which may be implemented with existing off-the-shelf, commercial, electronic components.

Still other objects, features and attendant advantages of the present invention will become apparent to those skilled in the art from a reading of the following detailed description of the preferred embodiment constructed in accordance therewith, taken in conjunction with the accompanying drawings wherein:

DESCRIPTION OF THE PREFERRED EMBODIMENT

Figure 1:
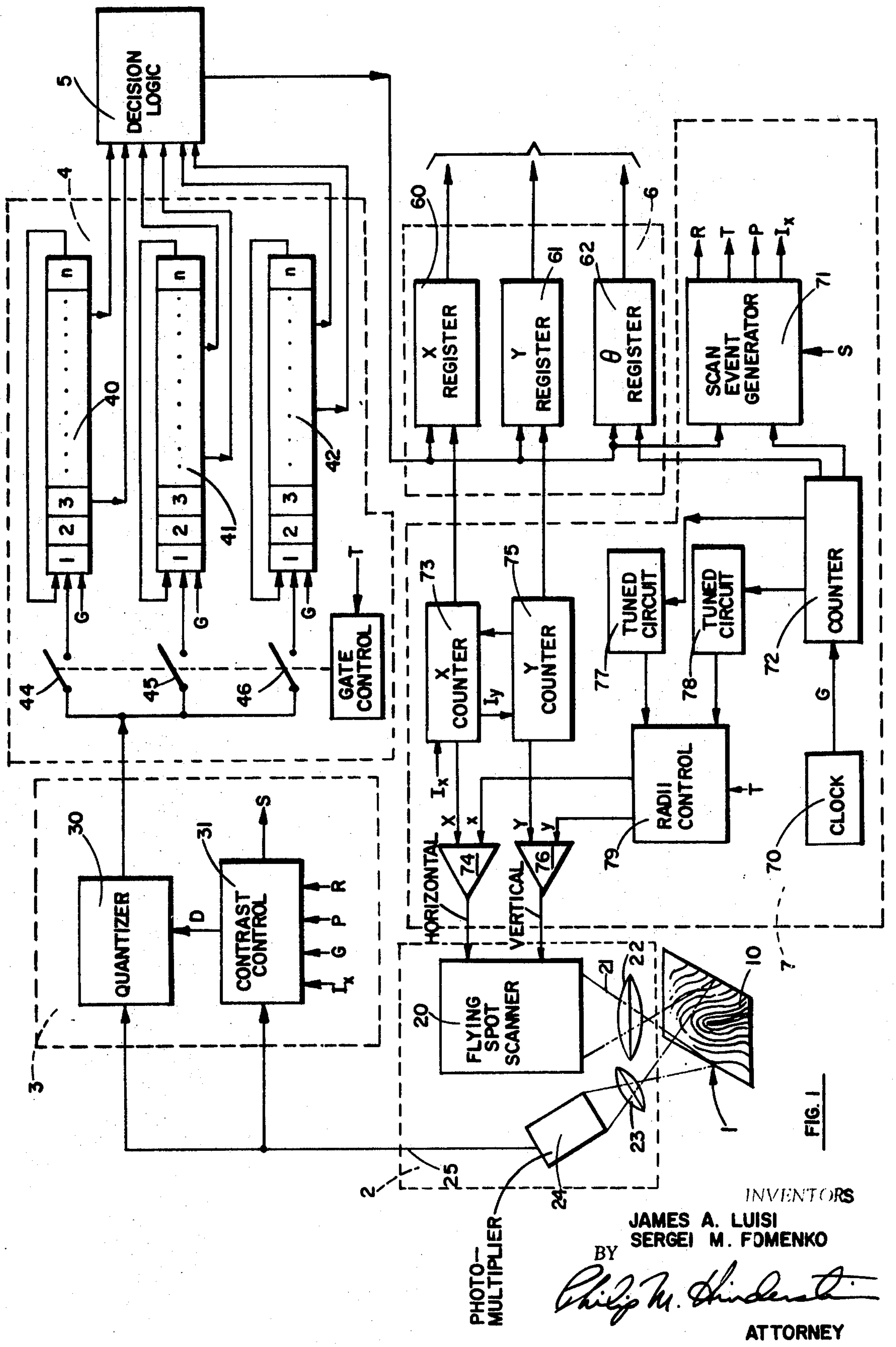
FIG. 1 is a block diagram of the present fingerprint minutiae reading device.

Referring now to the drawings and, more particularly, to FIG. 1 thereof, the proposed fingerprint minutiae reading device consists of an input device 1 which may, for example, be a manually operated fingerprint card, a scanning means 2 which may, for example, be a flying spot scanner, and a photomultiplier for scanning the entire fingerprint, a portion at a time, to derive, at each position, an analog signal indicative of the pattern at the position, a quantizer and associated contrast control 3 coupled to the output of scanning means 2 for transforming the analog signal to digital form, a temporary memory 4 which may, for example, consist of a plurality of digital shift registers, for temporarily storing samples from each small portion of the fingerprint, this digital representation being circulated through the shift registers so as to permit the detection of the specified minutiae, if any, regardless of the angular orientation thereof, decision logic 5 coupled to memory 4 for sensing the states of selected stages of the shift registers, an output register 6 for providing a digital output indicative of the location and angular orientation of the detected minutiae, and associated electronic circuitry 7 for controlling the entire system.

A fingerprint card 10 may be inserted into the present system manually and manipulated in any desired manner so that the fingerprint is positioned underneath flying spot scanner and photomultiplier 2. The accuracy of positioning is not important since there is no requirement for recording the absolute coordinates of detected minutiae. Under the control of circuitry 7, a flying spot scanner 20 causes a beam of light 21 to scan fingerprint card 10. A suitable lens 22 may be inserted between flying spot scanner 20 and fingerprint card 10 to focus beam 21 onto a spot of predetermined size. Scanning of fingerprint card 10 is accomplished in two modes. The first, x—Y mode, advances beam 21 digitally from point to point along a typical raster pattern by increments of any desired size. For example, there may be 600 steps in the $x$ direction and 500 steps in the $y$ direction, so that a total of 300,000 individual locations on the fingerprint are scanned. The coordinates for each set of observations are generated automatically by control circuitry 7, as will be explained more fully hereinafter.

Figure 2:
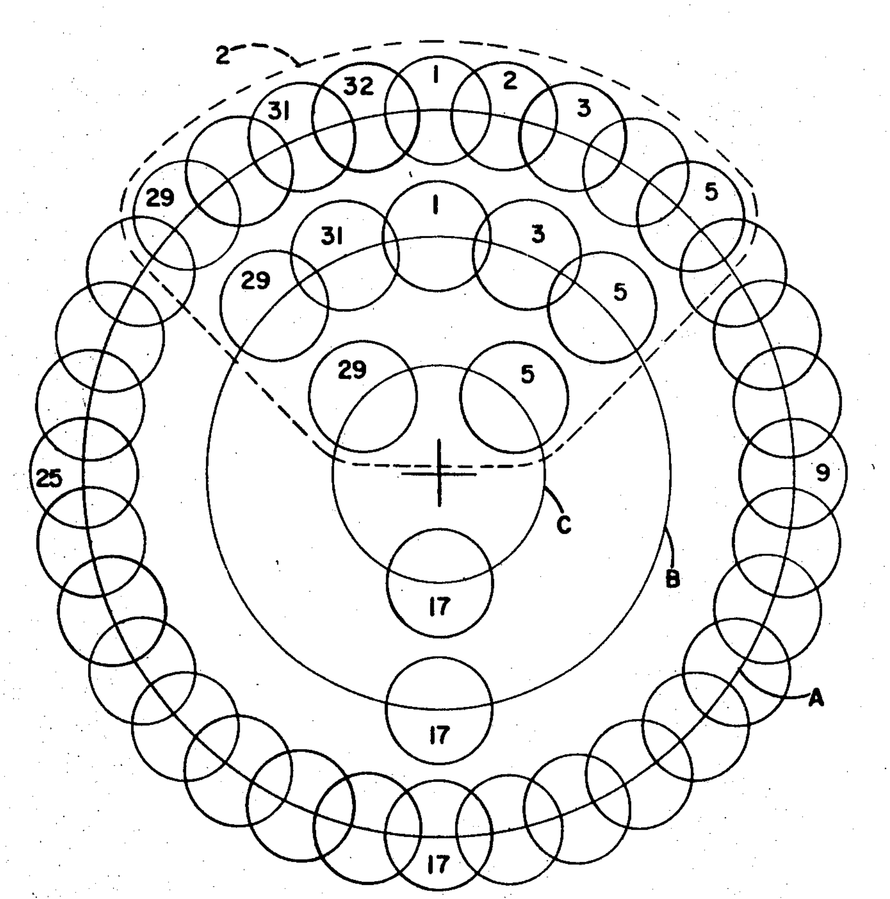
FIG. 2 is a diagram showing the present sampling technique.

Referring now to FIG. 2, at each position, beam 21 undergoes the second, or polar, scanning mode. The beam spot is made to scan a small circular area of the fingerprint along a plurality of concentric circles. According to a preferred embodiment of the invention, the beam spot is made to scan along three concentric circular paths labeled A, B and C, in that sequence. During each polar scan, the circular area of the fingerprint is observed, a small portion at a time, these small portions being denoted 1 through 32, for example, in FIG. 2. The light reflected by fingerprint 10 may be focused by a lens 23 onto a photomultiplier tube 24 which provides, on a line 25, an electrical analog signal indicative of the pattern contained on fingerprint card 10 within the small circular area. The analog signal on line 25 is applied simultaneously to a quantizer 30 and a contrast control circuit 31. In one embodiment, quantizer 30 is operative to compare the analog signal on line 25 with a given threshold value and to produce a binary 1 if the analog signal level is above the threshold value and a binary 0 if the analog signal level is below the threshold value. However, this is by no means a requirement of the present invention. It will be apparent to those skilled in the art that several threshold levels may be used and the analog signal at each of positions 1 through 32 converted into a digital signal having two or more bits. But for reasons of simplicity, the present invention will be described with quantizer 30 having a single fixed threshold level. In other words, the quantizer is a fixed signal level detector. If the signal generated by photomultiplier tube 24 is below a fixed voltage level, the quantizer generates a false output pulse. If the signal generated by photomultiplier tube 24 is above the fixed voltage level, a true output pulse is generated.

Contrast control 31 is operative to adjust the level of the threshold value or values in quantizer 30 as a function of the local quality of the fingerprint. In the embodiment using a fixed level detector as the quantizer 30, the contrast control 31 is not required. The resultant digital signal is applied to temporary memory 4 which includes a plurality of synchronized, circulating shift registers 40, 41 and 42, one for each of the scanning orbits, under the control of a gate control circuit 43 which is operative to alternately and sequentially close switches 44, 45 and 46 between the output of quantizer 30 and the inputs of shift registers 40, 41 and 42, respectively. A direct and simple synchronism of each of registers 40, 41 and 42 may be established by matching the period of each of orbits A, B and C with the circulating period of the registers.

In general, each of registers 40, 41 and 42 has $n$ stages where $n$ is equal to the number of small portions observed in each of orbits A, B and C. In the present example, since each orbital scan is divided into 32 separate positions, each of registers 40–42 has 32 storage elements and is capable of storing 32 samples corresponding to the 32 individual positions on each orbital scan. In the event that the output of quantizer 30 is a two or more bit digital signal, registers 40–42 would each have a corresponding number of parallel channels.

After 96 samples have been loaded into registers 40, 41 and 42, the bit pattern continues to circulate through the registers. This has the effect of rotating the fingerprint pattern with respect to decision logic 5 which is interconnected with registers 40, 41 and 42 in a manner which will become clearer hereinafter. As the pattern circulates once, 32 binary decisions (yes/no) are made. A yes decision causes the contents of output register 6 to read out both the X and Y coordinates of the scan point as well as the angular orientation of the detected minutiae. Upon completion of the decision cycle, the encoded output is made available for transmission if recognition occurs.

The present fingerprint minutiae reading device is capable of locating and identifying any specified type of minutiae such as ridge endings, bifurcations and the like. It is also capable of the simultaneous detection of any number of types of minutiae or any combination thereof. However, for purposes of explanation only, the detection of ridge endings will be described herein, and the manner of extending the system to other types of minutiae will be discussed later.

Figure 3:
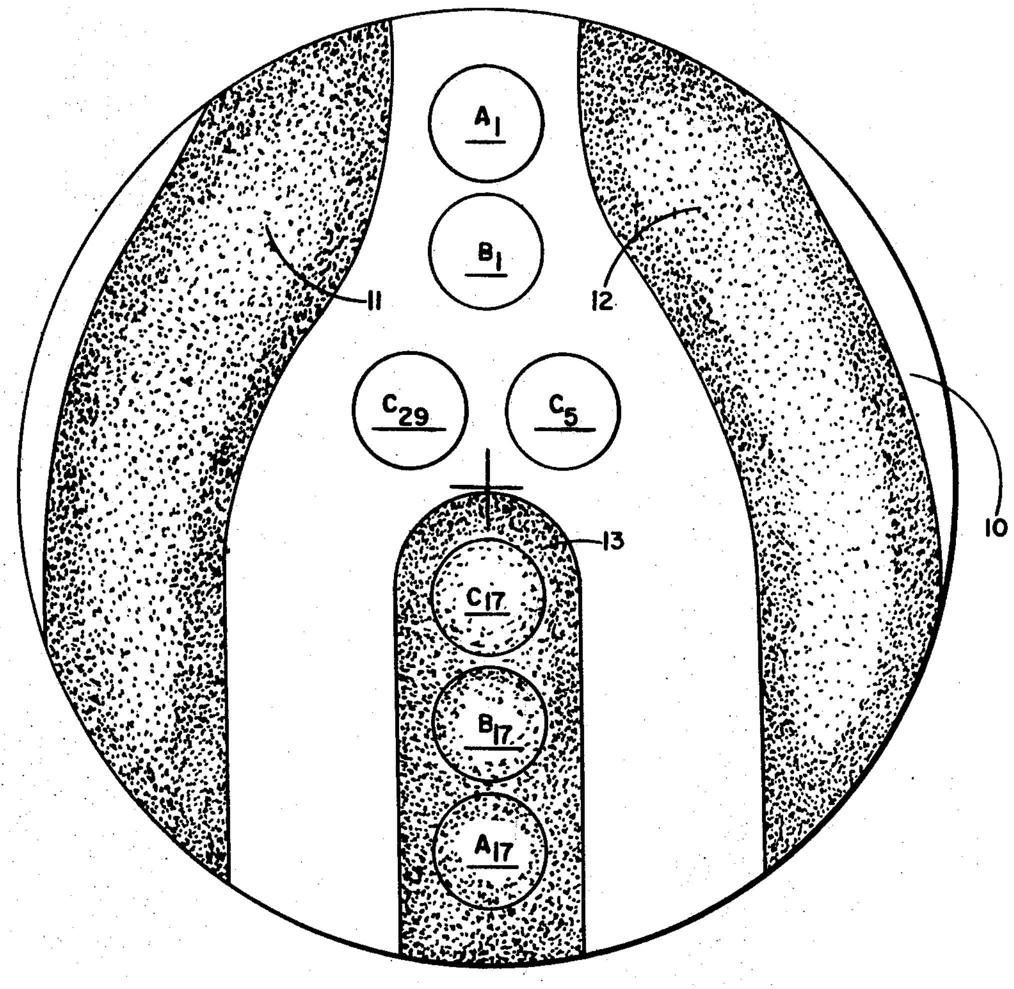
FIG. 3 is an exploded view of a portion of a fingerprint showing its relationship to the present scan pattern.

Referring now to FIG. 3, there is shown an enlarged portion of a fingerprint 10 containing first and second continuous lines 11 and 12, corresponding to fingerprint ridges, and a line 13 corresponding to a ridge ending. The scale shown in FIG. 3 is the same as that shown in FIG. 2 and shows the area which would be encompassed within a polar scan of flying spot scanner 20. According to the present invention, such a ridge ending may be detected by noting that for such a minutia, certain predeterminable conditions exist. For example, as shown in FIG. 3, a ridge ending is characterized in that flying spot scanner 20 will encounter a nearly white area at the first position in orbit A, the first position in orbit B and the fifth and 29th positions in orbit C. Similarly, a ridge ending is characterized in that flying spot scanner 20 will encounter a dark area at the 17th position in each of orbits A, B and C. In addition, even though ridge ending 13 may have any angular orientation through 360°, the relative positions of the significant scan locations remains the same.

The present invention utilizes these relationships to locate specified minutiae such as a ridge ending as shown in FIG. 3. To this end, the digital value of the fingerprint pattern at each of the 32 scan points in orbit A is loaded into shift register 40 by closure of switch 44. The data in register 40 then continues to circulate while the digital value of the fingerprint patterns at each of the 32 scan points in orbit B is loaded into register 41 by closure switch 45. The data in registers 40 and 41 continues to circulate while the digital value of the fingerprint pattern at each of the 32 scan points in orbit C is loaded into shift register 42 by closure of switch 46. After all 96 samples have been loaded into registers 40–42, the bit pattern in each continues to circulate. This rotation has the effect of rotating the pattern shown in FIG. 3 through 360°. Recognition of the presence of a minutiae is achieved by the use of decision logic 5 which receives as inputs the states of selected stages in each of shift registers 40, 41 and 42. In other words, in the case of a ridge ending as shown in FIG. 3, decision logic 5 would receive two inputs from register 40 representing the first and 17th stages, two inputs from register 41 representing the first and 17 stages and three inputs from register 42 representing the 5th 17th and 29th stages. Decision logic 5 is operative to sense the simultaneous occurrence of the required states of these stages. However, as pointed out above, it is not necessary that the ridge ending have the orientation shown in FIG. 3, since the constant circulation of the bit pattern contained in registers 40, 41 and 42 has the effect of continuously rotating the fingerprint pattern with respect to the fixed decision logic inputs.

According to the present invention, a minutiae is detected only when its position (the center of the ridge ending) is within a predetermined distance from the center of the triorbital scan, this distance being a function of the spot diameter and the diameters of orbits A, B and C. If a ridge ending is within the area covered by a triorbital, polar scan, but its position is outside of the predetermined distance, no recognition is made. However, this minutiae will be detected at a subsequent time when its center is within the prescribed limit.

When decision logic 5 detects the presence of a minutiae, a signal is applied to output register 6 which is caused to read out the X and Y location of the scan point, together with the angular orientation of the minutiae.

It will now be apparent to those skilled in the art that the present apparatus may be used to detect any type of minutia and to simultaneously detect any number or combination of minutiae. In other words, in order to detect any other type of minutiae, the shape thereof must first be ascertained so that the conditions which characterize it may be determined. Once this is done, it is a simple matter to select those stages of registers 40–42 whose combined states will signal the presence of the minutia. Additional decision logic circuits may be used, one for each minutia to be located, to sense the states of these selected stages in registers 40–42 and to signal the presence of a minutia. The outputs of all of the decision logic circuits, which may, most simply, consist of AND and NAND gates, may be connected to a single OR gate whose output is applied to output register 6.

Referring again to FIG. 1, according to one embodiment of the invention, the scan pattern is controlled by both digital and analog signal generators which are synchronized by a clock 70. Digital techniques are provided to produce the signals which determine the coordinates X, Y of the scan point. Analog circuitry produces two sinusoidal signals $x$, $y$ which are equal in frequency and amplitude but have a 90° phase difference, which are used to perturb the deflection of the electron beam in flying spot scanner 20 around the scan point. The amplitude of the sinusoidal signals may have three discrete values to define the radii of orbits A, B and C.

Sequencing of the entire operation is controlled by a scan event generator 71 which is controlled by clock 70 via a counter 72. Scan event generator 71 is operative to produce a signal $I_x$ which is applied to an X counter 73 which may be capable of counting, for example, up to 600 and whose output is applied via a summing amplifier 74 to the horizontal input of flying spot scanner 20 to control the X coordinate of the scan point. $I_x$ is a digital signal which increments the count of X counter 73. When the count in X counter 73 reaches 600+1, X counter 73 is reset to zero and a signal $I_y$ is applied to a Y counter 75 which is caused to advance one count. Y counter 75 may be capable of counting, for example, up to 500. The output of Y counter 75 is applied via a summing amplifier 76 to the vertical control input of flying spot scanner 20 to control the Y coordinate of the scan point. When Y counter 75 reaches a count of 500+1, it, along with X counter 73, is reset to zero. The values of X and Y contained in counters 73 and 75, respectively, are provided to an X register 60 and a Y register 61, respectively, in output register 6 so that the instantaneous value of the count contained in counters 73 and 75 is always available.

The T signal controls the position of switches 44 through 46 as well as the scanning radius for the flying spot scanner 20. The $I_x$ signal controls the linear position of the flying spot scanner after the ABC polar scans. In its simplest embodiment, the scanning generator 71 may be implemented by decode logic such as AND gates. In that case, the counter states of counter 72 are decoded into signals T and $I_x$. For example, at count one, a first T signal is decoded for closing switch 44 which may, for example, be a field-effect transistor. The switch remains closed through a count of 32. At the end of the first 32 counts, the T signal applied to switch 44 is disconnected and a second T signal is generated from the decoded count 33 or the new count one, for closing switch 45. Simultaneously, the second T signal provides an input to radii control 79 for reducing the scanning radius of the flying spot scanner 20. During the next count of 32, a third T signal is generated for closing switch 46 and for further reducing the radius of the flying spot scanner. At the end of three counts of 32, a new $I_x$ signal is generated for incrementing counter 73. Obviously, therefore, simple AND gate logic can be used to implement a scan event generator within the scope of the invention.

According to a preferred embodiment of the present invention, clock 70 may operate at a frequency of 2.0 MHz. The output G of clock 70 is applied to counter 72 which is operative to count the pulses from clock 70 and to provide a first output square wave at 62.5 kHz. (1/32nd of 2.0 MHz). This signal is used to establish the time for one orbital scan and is applied, with a 90° phase difference, to a pair of tuned circuits 77 and 78, which pass only the fundamental components of the two 62.5 kHz. square waves. The two sinusoidal output signals from tuned circuits 77 and 78 have the same frequency and amplitude but differ in phase by 90°. The outputs of tuned circuits 77 and 78 are applied to a radii control circuit 79 which is operative, under the control of a signal T from scan event generator 71, to adjust the amplitudes of the sine waves through three steps which are appropriate to generate the orbits A, B and C shown in FIG. 2. The outputs of radii control circuit 79 are applied to summing amplifiers 74 and 76 where they are summed with the signals from counters 73 and 75, respectively, and applied therewith to the horizontal and vertical inputs, respectively, of flying spot scanner 20.

The 62.5 kHz. signal from counter 72 and the clock signal G are applied to scan event generator 71 for synchronization thereof. In the absence of any additional apparatus, scan event generator 71 is operative, after four complete cycles of the 62.5 kHz. square wave, representing four complete scan cycles, to generate the signal $I_x$ to increment X counter 73. The first three scan cycles are used to scan orbits A, B and C whereas the fourth scan cycle is used to permit the bit pattern contained in registers 40–42 to circulate once. At the end of this period, X counter 73 is incremented and the scan pattern repeats at the new location.

A refinement of the basic scan pattern is desirable to allow for variations in the quality and position of fingerprints on fingerprint card 10. In general, at each scan point, a preliminary scan of the fingerprint can be made to calibrate the system automatically. A contrast control circuit 31, which is connected via line 25 to the output of photomultiplier tube 24, can measure the local variations of the reflected light intensity along outer orbit A. The result of this binary scan establishes the local range of intensity which can be used to define the threshold within quantizer 30. Furthermore, if no variations in light intensity are sensed, which may occur in the event of blanks or ink blots, this will indicate that there is no local detail worth scanning so the scan program can be advanced to prevent a waste of time by sampling further around that scan point.

More specifically, the local variations in intensity of an image are expected to range from zero for blanks or ink blots to a maximum defined by bright illumination of an exceptionally clear fingerprint. For this purpose, quantizer 30 may contain a comparator (not shown) which operates by making a comparison of the analog signal contained on line 25 with a threshold value. However, the operation of the system will be erratic unless automatic contrast control is employed to normalize the range of variations. Therefore, contrast control 31 may include a peak-to-peak detector (not shown) which measures the maximum variation sensed while scanning the outer orbit A during a preliminary scan cycle. The preliminary scan cycle may be achieved during the time period that the information is being circulated in registers 40–42 to make a determination as to the presence of a minutiae. In other words, after counter 72 signals the scan of orbit C at a specified location, scan event generator 71 may operate to generate the signal $I_x$ to increment X counter 73 and the signal P to contrast control circuit 31 so that a scan of orbit A at the next location may be made during the time that decision logic 5 is determining the presence or absence of a minutiae at the previous scan location. If the output of the peak detector exceeds a given threshold, a binary signal S may be sent to scan event generator 71 to indicate the presence of local detail and to permit the complete three orbit scan of that location. In this case, the measured peak variation D is applied to quantizer 30 to adjust the level of the threshold so that the samples obtained on the A, B and C scan cycles can be quantized properly.

In the event that the peak-to-peak detector within contrast control 31 indicates the lack of significant local detail at the next scan point, a signal R is generated by scan event generator 71 which may be used to reset contrast control 31. Simultaneously, the signal $I_x$ is generated to cause X counter 73 to increment to the next scan location. This procedure will then continue with only the outer orbit A being scanned at each location until contrast control 31 indicates the presence of local detail.

In summary, after the circuit is initialized, scan event generator 71 will establish orbit A and a preliminary scan thereof will be made. In the event that contrast control 31 does not sense intensity variations during such scan, a signal S will be applied to scan event generator 71 which first generates the signal R to reset contrast control 31, then generates the signal $I_x$ to increment X counter 73 and then generates the signal P to cause contrast control 31 to make a preliminary scan of orbit A at the next location. This procedure continues until contrast control 31 senses an intensity variation at the new location. In this event, signal D establishes the threshold level in quantizer 30 and each of orbits A, B and C are scanned with the resultant signals being fed into registers 40, 41 and 42, respectively. At the end of the scan of orbit C, scan event generator 71 generates the signal $I_x$ to increment X counter 73 so that during the next scan cycle a preliminary scan of orbit A at the next scan location can be made. Simultaneously, the bit pattern stored in registers 40–42 is circulated for one scan cycle to permit decision logic 5 to determine the presence or absence of a minutiae. In the absence of a sensed minutiae, no signal is generated by decision logic 5 and the scanning procedure continues as above. On the other hand, if decision logic 5 senses the presence of a minutia, a signal is generated to output register 6 which provides an output indicative of the position and angular orientation of the sensed minutiae.

Circulating shift registers 40–42 provide, under control of clock 70, temporary storage for a digital representation of the local details in the neighborhood of a scan point. Registers 40–42 may consist of 96 flip-flops organized into three 32-bit registers. Each register is used to circulate the 32-bit samples which are collected along each of the three orbital scans A, B and C. Each register shifts once per clock cycle. It takes 32 clock cycles (one scan cycle) to circulate any pattern through a register. The loading of the registers is controlled by the signal T generated by scan event generator 71 in response to one complete cycle of the 62.5 kHz. square wave from counter 72. In other words, during a first scan cycle, gate control 43, in response to signal T, operates to close switch 44 and radii control 79 operates to adjust the outputs of circuits 77 and 78 to generate orbit A. The sequence of bit samples from quantizer 30 is gated into register 44 during the scan of orbit A. At the end of one scan cycle, scan event generator 71 generates signal T to cause gate control 43 to open switch 44 and close switch 45 as well as adjusting radii control circuit 79 to generate orbit B. During orbit B, the sequence of bit samples from quantizer 30 is gated into register 41. Finally, at the end of one scan cycle, scan event generator 71 generates signal T to cause gate control 43 to open switch 45 and close switch 46 and radii control 79 to adjust the amplitude of the signals from circuits 77 and 78 to generate orbit C. During orbit C, the sequence of bit samples from quantizer 30 are applied to register 42. It should be noted that registers 40–42 circulate continuously under control of signal G from clock 70. The gating signal T enables quantizer 30 to write into the proper register at the proper time while maintaining the synchronism of the bit pattern.

The bit pattern which is loaded into registers 40–42 represents the pattern variations in the neighborhood around a scan point. This coded representation can be rotated in 32 discrete steps with respect to the registers. The 96 flip-flops in registers 40–42 can be tapped to permit any arbitrary wiring network to be formed between the flip-flops and decision logic 5.

When a triorbital scan is completed, the digital value of the scanned portion of the fingerprint has been loaded into a temporary memory and is being rotated because of the circulation of the information bits in the three circulating registers. The detection of specified minutiae is accomplished by observing the states of several selected flip-flops in the three circulating registers. As explained above, this may be accomplished by connecting the output of the selected flip-flops to the input of decision logic 5 which operates to detect the presence of a specified condition, such as that shown in FIG. 3. Upon the detection of such a condition, decision logic 5 provides a signal to output register 6 which consists of X register 60, Y register 61 and a $\theta$ register 62. As explained previously, X register 60 and Y register 61 receive as inputs the signals from X counter 73 and Y counter 75, respectively, to constantly provide an indication of the X and Y coordinates of the scan point. $\theta$ register 62 receives a signal from counter 72 indicative of the instantaneous count therein so as to constantly contain an indication of one of 32 possible orientations as the scan pattern is circulated. $\theta$ register 62 normally copies the contents of counter 72 unless a recognition decision inhibits further change thereof. If a recognition decision is made, the availability of output data is signalled by decision logic 5 and the data is transmitted out of output register 6.

A further modification of the present system may be made to inhibit the detection of false ridge endings at the boundaries of fingerprint impressions. Referring again to FIG. 2, a group of 26 samples from a sector encompassed by a dotted line 2 may be used for this determination. When all these samples are in the state of nearly white, this indicates the presence of the boundary condition rather than a legitimate ridge ending and the detection of a ridge ending should be inhibited. The same approach can be used to inhibit the detection of false ridge endings produced by scars, warts, or other ridge obliterating defects. For this purpose, a logic circuit (not shown) may be interconnected with the flip-flops in registers 40, 41 and 42 so as to detect the simultaneous presence of a nearly white signal in each of the locations within dotted line 2 in FIG. 2. When this occurs, a signal may be provided to scan event generator 71 to inhibit a false reading and to cause X counter 73 to be reset to zero to start the scan of the next line.

While the invention has has described with respect to a preferred physical embodiment constructed in accordance therewith, it will be apparent to those skilled in the art that various modifications and improvements may be made without departing from the scope and spirit of the invention. For example, although the present invention has been described with respect to a system for detecting specified minutiae in fingerprint, it will be obvious to those skilled in the art that the present invention is broadly applicable to the field of pattern recognition. Accordingly, it is to be understood that the invention is not to be limited by the specific illustrative embodiment, but only by the scope of the appended claims.

We claim:

1. Apparatus for determining the presence of a specified pattern within a given area comprising, means for sequentially positioning a spot scanner at coordinate points along linear axes including means for sequentially scanning the pattern at each coordinate point with a plurality of polar scans, each of said polar scans having said coordinate point as its center, means for generating a digital signal at successive points of each of said polar scans, said digital signals indicating the contrast at each point of the polar scan pattern at each coordinate point, means for independently storing the digital signals generated by each of said polar scans, including means for comparing the stored digital signals from each corresponding point of the polar scans for detecting predetermined relationships between the digital signals, including means for indicating the detection of said predetermined relationship, counter means for passing sequentially through a plurality of counts in synchronization with the comparison of said digital signals, and means responsive to the detection of a predetermined relationship between the positions of said polar scan and the count of said counter means for indicating the angular orientation of said detected pattern relative to an axis, so as to enable the recognition of the pattern characteristics regardless of said angular orientation.

2. The apparatus recited in claim 1 wherein said plurality of polar scans comprise three concentric polar scans and said means for storing comprises three shift registers including means for shifting the contents of the registers into said means for comparison.

3. The apparatus recited in claim 2 including means responsive to the count of said counter means for sequentially connecting the registers to the means for generating whereby digital signals for each polar scan can be stored, and means simultaneously responsive to said count for controlling the radius of said polar scan including means for decreasing the radius of the scan after each scan until three polar scans have been completed, and means responsive to the count in said counter means for moving said scanner to a subsequent coordinate point after the polar scans have been completed.